United States Patent
Inoue et al.

(10) Patent No.: US 9,897,204 B2
(45) Date of Patent: Feb. 20, 2018

(54) CONTROL APPARATUS AND CONTROL METHOD FOR AUTOMATIC TRANSMISSION

(71) Applicants: JATCO Ltd, Fuji-shi, Shizuoka (JP); NISSAN MOTOR CO., LTD., Yokohama-shi, Kanagawa (JP)

(72) Inventors: Mamiko Inoue, Ebina (JP); Hideshi Wakayama, Hadano (JP)

(73) Assignees: JATCO LTD, Fuji-Shi (JP); NISSAN MOTOR CO. LTD., Yokohama-Shi (JP)

( * ) Notice: Subject to any disclaimer, the term of this patent is extended or adjusted under 35 U.S.C. 154(b) by 163 days.

(21) Appl. No.: 15/021,111

(22) PCT Filed: Sep. 16, 2014

(86) PCT No.: PCT/JP2014/074438
§ 371 (c)(1),
(2) Date: Mar. 10, 2016

(87) PCT Pub. No.: WO2015/045964
PCT Pub. Date: Apr. 2, 2015

(65) Prior Publication Data
US 2016/0215879 A1 Jul. 28, 2016

(30) Foreign Application Priority Data
Sep. 25, 2013 (JP) .................. 2013-198554

(51) Int. Cl.
*F16H 61/00* (2006.01)
*F16H 59/00* (2006.01)
(Continued)

(52) U.S. Cl.
CPC ......... *F16H 61/702* (2013.01); *F16H 37/021* (2013.01); *F16H 61/66259* (2013.01);
(Continued)

(58) Field of Classification Search
CPC ..... F16H 61/16; F16H 61/18; F16H 2059/183
See application file for complete search history.

(56) References Cited

U.S. PATENT DOCUMENTS

| 8,657,720 | B2 * | 2/2014 | Kabe ................... F16H 61/6648 |
| | | | 477/43 |
| 2010/0179025 | A1 * | 7/2010 | Hyakutake .............. F16H 61/16 |
| | | | 477/125 |

(Continued)

FOREIGN PATENT DOCUMENTS

| JP | 2010-196810 A | 9/2010 |
| JP | 2012-057710 A | 3/2012 |

*Primary Examiner* — Tisha Lewis
(74) *Attorney, Agent, or Firm* — Foley & Lardner LLP (57) ABSTRACT

In a control apparatus for an automatic transmission including a continuously variable transmission mechanism continuously modifying speed ratio and a stepped transmission mechanism that is disposed on a downstream side of the continuously variable transmission mechanism and being switched between a plurality of gear positions by engaging and disengaging a plurality of frictional engagement elements, the control apparatus comprises a control unit that performs a coordinated shift by shifting the stepped transmission mechanism and simultaneously shifting the continuously variable transmission mechanism in an opposite direction to a shift direction of the stepped transmission mechanism in order to suppress variation in a through speed ratio, which is an overall speed ratio of the automatic transmission, when the stepped transmission mechanism is upshifted and the control unit predicts, on the basis of an increase in an accelerator opening, that judder will occur in the frictional engagement element during the upshift, the control unit reduces a shift speed of the continuously variable transmission mechanism while shudder is predicted to occur in the frictional engagement element in comparison with a shift speed of the continuously variable transmission (Continued)

mechanism during the coordinated shift, the coordinated shift being executed at an accelerator opening corresponding to the increased accelerator opening.

9 Claims, 7 Drawing Sheets

(51) Int. Cl.
*F16H 61/70* (2006.01)
*F16H 61/662* (2006.01)
*F16H 37/02* (2006.01)

(52) U.S. Cl.
CPC ................. *F16H 2037/023* (2013.01); *F16H 2061/66204* (2013.01)

(56) References Cited

U.S. PATENT DOCUMENTS

| | | | | |
|---|---|---|---|---|
| 2010/0332093 | A1* | 12/2010 | Ishikawa | B60W 10/06 701/62 |
| 2011/0313627 | A1* | 12/2011 | Ishikawa | F16H 61/16 701/51 |
| 2012/0059556 | A1 | 3/2012 | Tanaka et al. | |
| 2014/0329643 | A1* | 11/2014 | Matsuo | F16H 61/16 477/115 |

* cited by examiner

CONTROL APPARATUS AND CONTROL METHOD FOR AUTOMATIC TRANSMISSION

TECHNICAL FIELD

This invention relates to a control apparatus and a control method for an automatic transmission, with which a driver is prevented from experiencing discomfort.

BACKGROUND ART

An automatic transmission uses frictional engagement elements to connect and disconnect driving force transmission from a driving force source. When a frictional engagement element is controlled from a disengaged condition to an engaged condition, the frictional engagement element may vibrate, and this phenomenon is known as judder. Judder may cause a driver to experience discomfort and unease, and therefore control is conventionally performed to prevent judder from occurring.

Judder becomes steadily more likely to occur as input torque input into the frictional engagement element increases, and therefore JP2010-196810A discloses control for reducing a driving force of an engine serving as the driving force source when judder occurs.

SUMMARY OF INVENTION

In the conventional technique described in JP2010-196810A, control is performed to reduce the driving force of the engine by a steadily larger amount as an accelerator opening at a point where judder occurs increases. With this control, however, the driving force is reduced even when the driver increases the accelerator opening with the intention of increasing the driving force, and as a result, it may be impossible to obtain the driving force desired by the driver.

To solve this problem, driving force corresponding to the accelerator opening may be output by the engine while performing the control for reducing the driving force only during a period in which judder occurs. In this case, although the driving force desired by the driver is obtained, the driving force decreases temporarily in a judder occurrence region, leading to an undesired reduction in the driving force in spite of the fact that the driver has not performed a return operation on an accelerator pedal, and as a result, the driver experiences discomfort.

This invention has been designed in consideration of the problems described above, and an object thereof is to provide a control apparatus for an automatic transmission, with which judder can be prevented from occurring in a frictional engagement element during a shift while preventing a driver from experiencing discomfort.

According to one aspect of this invention, a control apparatus for an automatic transmission comprised by a continuously variable transmission mechanism capable of continuously modifying speed ratio and a stepped transmission mechanism that is disposed on a downstream side of the continuously variable transmission mechanism and can be switched between a plurality of gear positions by engaging and disengaging a plurality of frictional engagement elements, the control apparatus comprises a control unit that performs a coordinated shift by shifting the stepped transmission mechanism and simultaneously shifting the continuously variable transmission mechanism in an opposite direction to a shift direction of the stepped transmission mechanism in order to suppress variation in a through speed ratio, which is an overall speed ratio of the automatic transmission, when the stepped transmission mechanism is upshifted and the control unit predicts, on the basis of an increase in an accelerator opening, that judder will occur in the frictional engagement element during the upshift, the control unit reduces a shift speed of the continuously variable transmission mechanism while shudder is predicted to occur in the frictional engagement element in comparison with a shift speed of the continuously variable transmission mechanism during the coordinated shift, the coordinated shift being executed at an accelerator opening corresponding to the increased accelerator opening.

DESCRIPTION OF EMBODIMENTS

An embodiment of this invention will be described below with reference to the figures.

Figure 1:
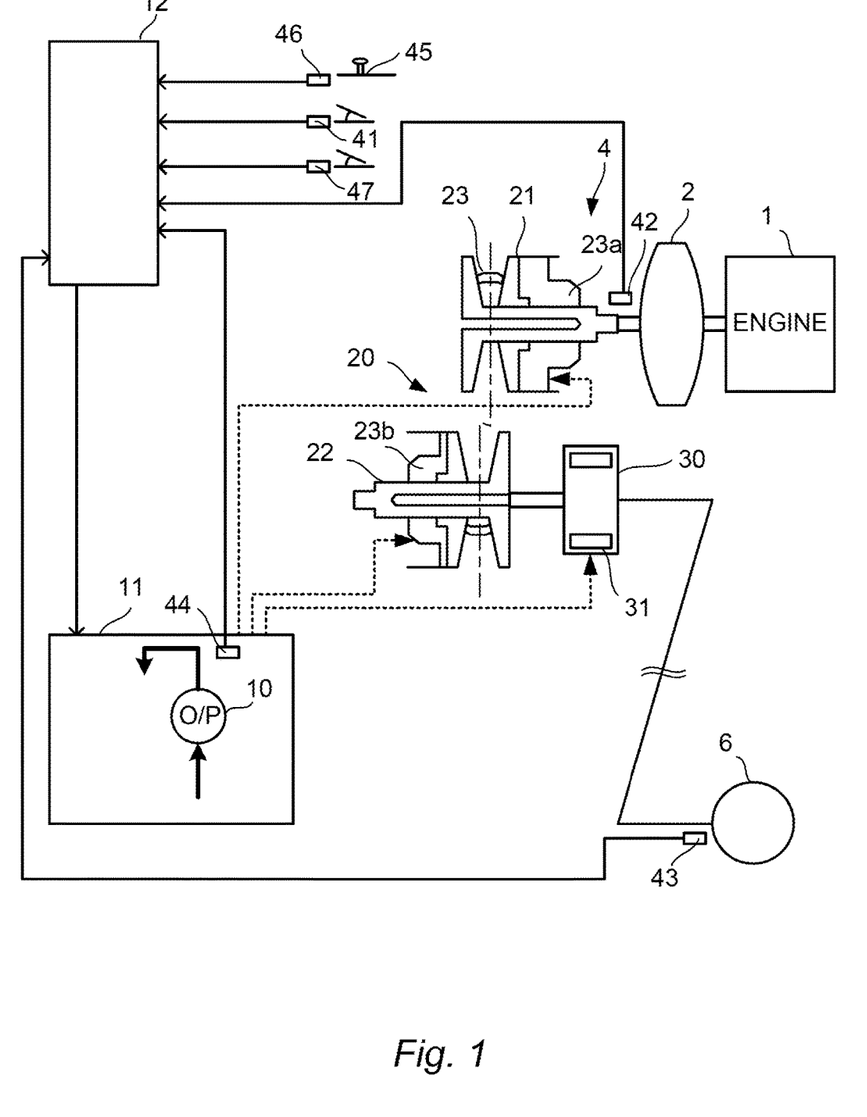
FIG. 1 is an illustrative view showing a configuration of a vehicle installed with a transmission according to an embodiment of this invention.

FIG. 1 is an illustrative view showing a configuration of a vehicle installed with a transmission 4 according to this embodiment.

The vehicle includes an engine 1 as a drive source. Rotation output by the engine 1 is transmitted to a drive wheel via a torque converter 2 having a lock-up clutch, an automatic transmission (referred to simply as "the transmission 4" hereafter), and a final reduction gear 6.

The vehicle is provided with an oil pump 10 that is driven using a part of power from the engine 1, a hydraulic control circuit 11 that regulates oil pressure from the oil pump 10 and supplies the regulated oil pressure to respective sites of the transmission 4, and a controller 12 that controls the hydraulic control circuit 11.

The transmission 4 includes a continuously variable transmission mechanism (referred to hereafter as a "variator 20"), and a stepped transmission mechanism (referred to hereafter as an "auxiliary transmission mechanism 30") disposed on a downstream side of the variator 20 and provided in series with the variator 20.

The variator 20 is a belt type continuously variable transmission mechanism comprising a primary pulley 21, a secondary pulley 22, and a V belt 23 wrapped around the pulleys 21, 22. The pulleys 21, 22 each comprise a fixed conical plate, a movable conical plate disposed such that a sheave surface thereof opposes the fixed conical plate, whereby a V groove is formed between the movable conical plate and the fixed conical plate, and a hydraulic cylinder 23a, 23b provided on a back surface of the movable conical plate in order to displace the movable conical plate in an axial direction. When oil pressure supplied to the hydraulic cylinders 23a, 23b is adjusted, a width of the V groove varies, leading to variation in a contact radius between the V belt 23 and the respective pulleys 21, 22, and as a result, a speed ratio vRatio of the variator 20 varies continuously.

The auxiliary transmission mechanism 30 is a two-forward speed, single-reverse speed transmission mechanism. The auxiliary transmission mechanism 30 comprises a planetary gear mechanism, and a plurality of frictional engagement elements 31 (a Low brake, a High clutch, and a Rev brake, for example) that modify a link condition of the planetary gear mechanism.

A gear position of the auxiliary transmission mechanism 30 is modified by adjusting oil pressure supplied to the frictional engagement elements 31 so as to modify engagement/disengagement conditions of the frictional engagement elements 31. For example, when the Low brake is engaged and the High clutch and Rev brake are disengaged, the gear position of the auxiliary transmission mechanism 30 is set at a first speed. When the High clutch is engaged and the Low brake and Rev brake are disengaged, the gear position of the auxiliary transmission mechanism 30 is set at a second speed having a smaller speed ratio than the first speed. When the Rev brake is engaged and the Low brake and High clutch are disengaged, the gear position of the auxiliary transmission mechanism 30 is set in reverse.

An output signal from an accelerator opening sensor 41 that detects an opening of an accelerator pedal (referred to hereafter as an "accelerator opening APO"), an output signal from a rotation speed sensor 42 that detects an input rotation speed of the transmission 4 (=a rotation speed of the primary pulley 21, referred to hereafter as a "primary rotation speed Npri"), an output signal from a vehicle speed sensor 43 that detects a travel speed of the vehicle (referred to hereafter as a "vehicle speed VSP"), an output signal from an oil temperature sensor 44 that detects an oil temperature of the transmission 4, an output signal from an inhibitor switch 46 that detects a position of a select lever 45, an output signal from a brake switch 47 that detects depression of a brake pedal, and so on are input into the controller 12.

On the basis of the input signals, the controller 12 determines a target speed ratio, refers to a pre-recorded shift map or the like in order to generate a shift control signal with which to control the speed ratio of the variator 20 and the gear position of the auxiliary transmission mechanism 30 so that an overall speed ratio (a through speed ratio) of the transmission 4 follows the target speed ratio, and outputs the generated shift control signal to the hydraulic control circuit 11.

The hydraulic control circuit 11 adjusts the oil pressure generated by the oil pump 10 to a required oil pressure on the basis of the shift control signal from the controller 12, and supplies the adjusted oil pressure to the respective sites of the transmission 4. As a result, the speed ratio of the variator 20 and the gear position of the auxiliary transmission mechanism 30 are modified, whereby a shift is performed in the transmission 4.

Figure 2:
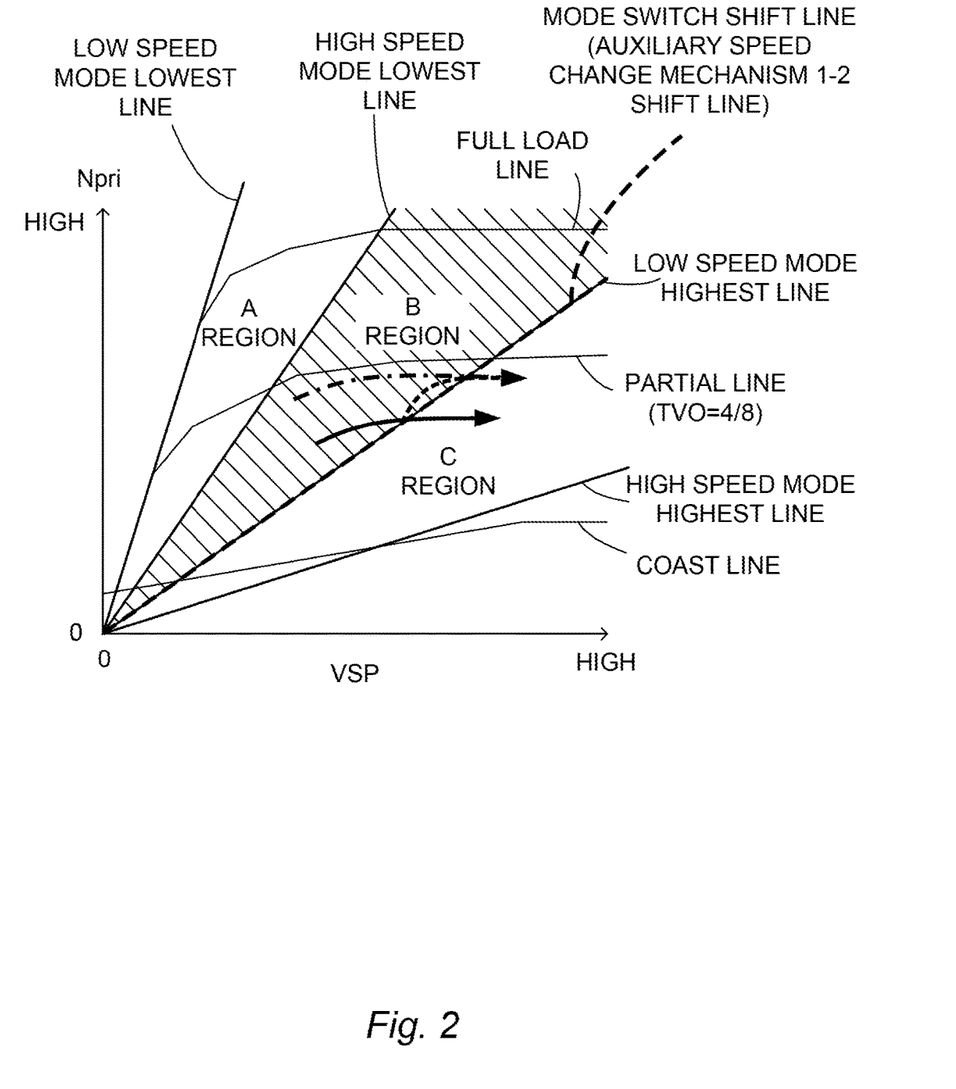
FIG. 2 is an illustrative view showing an example of a shift map according to an embodiment of this invention.

FIG. 2 is an illustrative view showing an example of the shift map provided in the controller 12 according to this embodiment.

Operating points of the transmission 4 are determined on the shift map in advance on the basis of the vehicle speed VSP and the primary rotation speed Npri.

The speed ratio of the transmission 4 is an overall speed ratio obtained by multiplying the speed ratio of the variator 20 by the gear position of the auxiliary transmission mechanism 30. Hereafter, the overall speed ratio will be referred to as the "through speed ratio".

When the transmission 4 is in a low speed mode, the auxiliary transmission mechanism 30 is at the first speed, and a shift can be performed in accordance with the speed ratio of the variator 20 within a low speed mode ratio range between a low speed mode Lowest line and a low speed mode Highest line. The operating point of the transmission 4 at this time moves within an A region or a B region.

When the transmission 4 is in a high speed mode, the auxiliary transmission mechanism 30 is at the second speed, and in accordance with the speed ratio of the variator 20, a speed ratio within a high speed mode ratio range between a high speed mode Lowest line and a high speed mode Highest line can be obtained. The operating point of the transmission 4 at this time moves within the B region or a C region.

In the B region, a shift can be performed regardless of whether the auxiliary transmission mechanism 30 is at the first speed or the second speed. In a region beyond the low speed mode Highest line, however, the auxiliary transmission mechanism 30 must be set at the second speed, and therefore a mode switch shift line for shifting the auxiliary transmission mechanism 30 from the first speed to the second speed is set along the low speed mode Highest line.

When the operating region varies so as to cross the mode switch shift line, the controller 12 shifts the auxiliary transmission mechanism 30 from the first speed to the second speed or from the second speed to the first speed.

When the auxiliary transmission mechanism 30 is shifted, a shift is performed by varying the speed ratio of the variator 20 in an opposite direction to the variation in the speed ratio of the auxiliary transmission mechanism 30 in order to suppress variation in the through speed ratio of the transmission 4. By performing this shift, discomfort experienced by the driver due to input rotation variation generated as a result of a step in the speed ratio of the auxiliary transmission mechanism 30 can be suppressed.

In this embodiment of the invention, a shift operation in which the speed ratio of the auxiliary transmission mechanism 30 and the speed ratio of the variator 20 are caused to vary in mutually opposite directions in order to suppress variation in the through speed ratio, as described above, will be referred to as a "coordinated shift". In the coordinated shift according to this embodiment, the speed ratio of the variator 20 is shifted in the opposite direction to the auxiliary transmission mechanism 30 by an amount corresponding to the amount of variation in the speed ratio of the auxiliary transmission mechanism 30. However, the variator 20 may be shifted such that the through speed ratio varies.

It should be noted that operations of the controller 12 and the hydraulic control circuit 11, and in particular the coordinated shift in which the variator 20 and the auxiliary transmission mechanism 30 are shift-controlled simultaneously, are described in JP2012-57710A, which was filed previously by the present applicant.

Incidentally, when the auxiliary transmission mechanism 30 is shifted during the speed ratio control described above, the frictional engagement elements 31 are engaged and disengaged. At this time, judder may occur on the engagement side, or in other words in the frictional engagement element 31 that is switched from the disengaged condition to the engaged condition. During a 1-2 switch, the High clutch serves as the engagement side frictional engagement element 31.

judder is steadily more likely to occur in the frictional engagement element 31 as input torque input into the frictional engagement element 31 increases, and as a rate at which a rotation speed of the frictional engagement element 31 varies during the switch from the disengaged condition to the engaged condition decreases.

Figure 3:
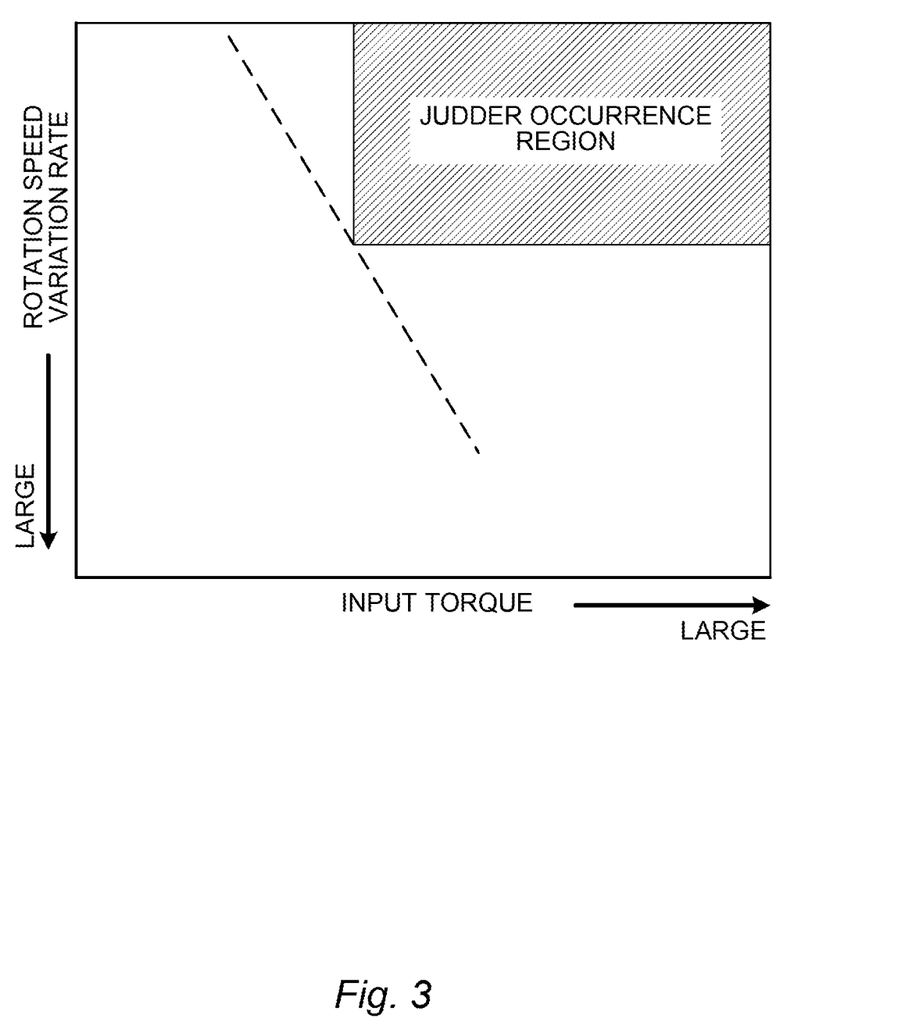
FIG. 3 is an illustrative view showing the occurrence of judder in a frictional engagement element according to an embodiment of this invention.

FIG. 3 is an illustrative view showing the occurrence of judder in the frictional engagement element 31 according to this embodiment of the invention.

FIG. 3 shows a region in which judder occurs when the input torque input into the frictional engagement element 31 is set on the abscissa and the rate at which the rotation speed of the frictional engagement element 31 varies during a shift is set on the ordinate.

As described above, judder is steadily more likely to occur as the input torque input into the frictional engagement element 31 increases and the rotation speed variation rate decreases.

For example, when a so-called power ON upshift (indicated by a solid line arrow in FIG. 2) is performed, or in other words when the auxiliary transmission mechanism 30 is upshifted from the first speed to the second speed in accordance with the shift map shown in FIG. 2 as the vehicle speed increases while the accelerator is depressed, in view of the fact that the mode switch shift line is set along the low speed mode Highest line, the upshift is performed in a condition where the speed ratio of the variator 20 is on the Highest side, and therefore the amount of torque input into the auxiliary transmission mechanism 30 from the engine 1 is reduced. Hence, to prevent judder from occurring, the controller 12 shifts the auxiliary transmission mechanism 30 while controlling the variation rate of the frictional engagement element 31 relative to the reduced input torque so as to avoid the judder occurrence region, as shown by a dotted line in FIG. 3.

When the accelerator pedal is depressed further during a 1-2 shift in the auxiliary transmission mechanism 30 (as shown by a dotted line arrow in FIG. 2), the input torque increases further, and as a result, the input torque may enter the judder occurrence region shown in FIG. 3. Judder is not only uncomfortable for the driver, but may also reduce the durability of a facing of the frictional engagement element. It is therefore desirable that judder be suppressed.

More specifically, in FIG. 2, a 1-2 shift line of the auxiliary transmission mechanism 30 is set in the vicinity of the Highest line of the variator 20 at the first speed of the auxiliary transmission mechanism 30. Since the speed ratio of the variator 20 is in the vicinity of the highest line, the torque input into the auxiliary transmission mechanism 30 is set to be at a minimum when the auxiliary transmission mechanism 30 is upshifted. Accordingly, the amount of torque input into the frictional engagement element 31 of the auxiliary transmission mechanism 30 when the auxiliary transmission mechanism 30 is upshifted is small enough to remain outside the judder occurrence region, and therefore judder does not occur (as shown by the dotted line in FIG. 3). When the accelerator pedal is depressed further during the upshift in the auxiliary transmission mechanism 30, however, the input torque increases, and as a result, judder may occur.

To prevent judder from occurring, the controller 12 may issue an instruction to the engine 1 to reduce the torque when the torque is in the judder occurrence region. However, when the torque is reduced while the driver depresses the accelerator pedal further, the driver experiences discomfort.

In response to this problem, a configuration described below is employed in this embodiment of the invention to prevent judder from occurring in the frictional engagement element 31 while suppressing the discomfort experienced by the driver when the accelerator pedal is depressed further, leading to an increase in engine torque, during a power ON upshift.

When the auxiliary transmission mechanism 30 enters the judder occurrence region during a power ON upshift, as described above, the controller 12 predicts that judder will occur, and performs control to suppress judder while judder is predicted to occur. This control will be described in detail below with reference to a flowchart shown in FIG. 4.

Figure 4:
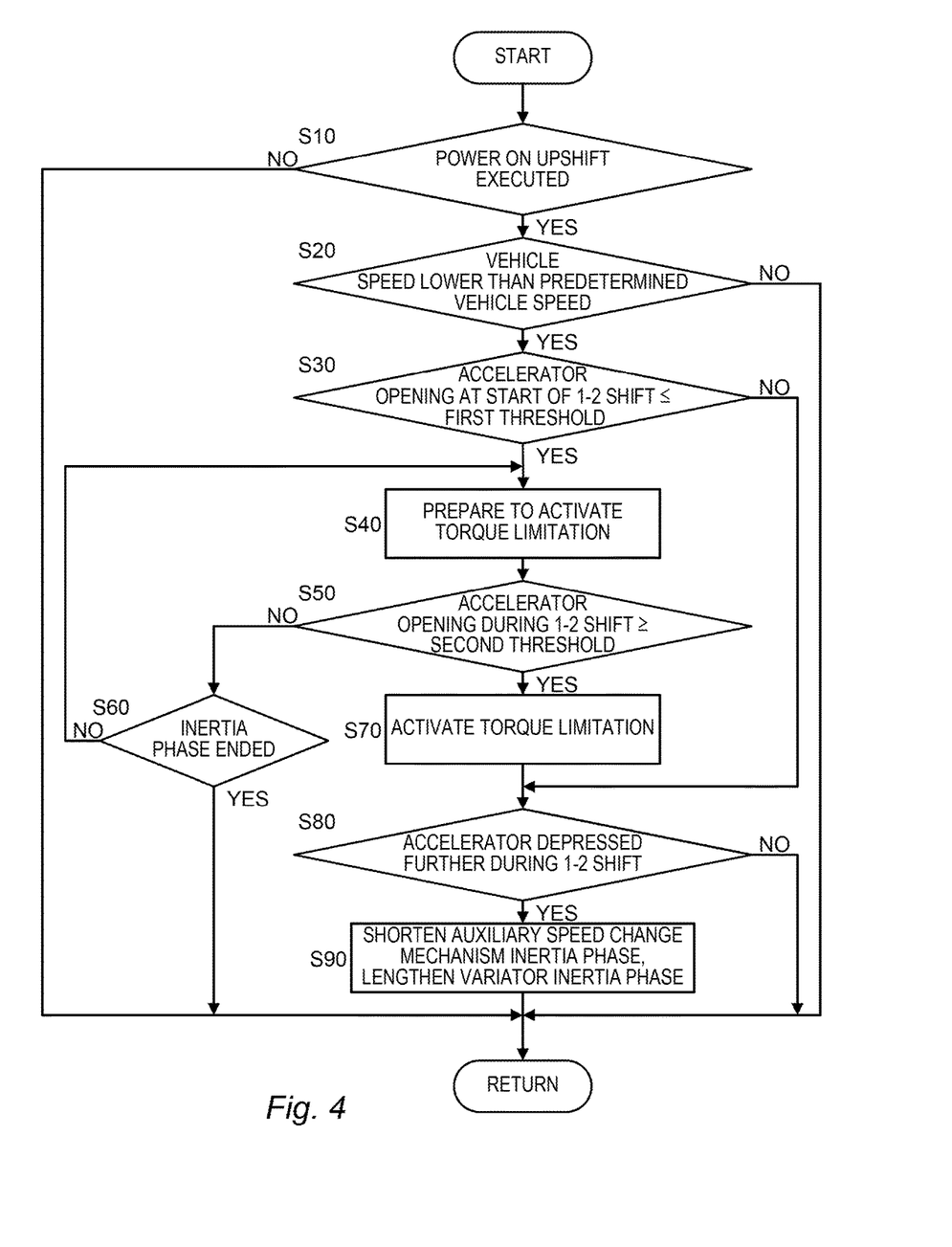
FIG. 4 is a flowchart showing judder prevention control according to an embodiment of this invention.

FIG. 4 is a flowchart showing judder prevention control executed by the controller 12 according to this embodiment of the invention. The flowchart shown in FIG. 4 is executed by the controller 12 at intervals of a predetermined period (10 ms, for example) in parallel with other processing.

When the flowchart is started, the controller 12 determines, in a step S10, whether or not a power ON upshift is being executed in the auxiliary transmission mechanism 30.

The controller 12 determines that a power ON upshift is being executed by identifying an operating condition in which the auxiliary transmission mechanism 30 is shifted from the first speed to the second speed across the mode switch shift line in the direction of the solid line arrow shown in FIG. 2 as the vehicle speed increases while the accelerator pedal is depressed. When it is determined that a power ON upshift is being executed, the routine advances to a step S20. When it is determined that a power ON upshift is not being executed, the processing of the flowchart is temporarily terminated, and other processing is resumed.

In the step S20, the controller 12 determines whether or not the vehicle speed VSP at the point where the power ON upshift is determined to be underway in the step S10 is lower than a predetermined vehicle speed.

When the vehicle speed is high, the rotation speed variation rate during the shift increases, and therefore the rotation speed variation rate remains in a region on a lower side of the judder occurrence region shown in FIG. 3. Accordingly, judder does not occur. If the judder prevention processing is performed outside the judder occurrence region, or in other words when judder is not predicted to occur, the driver may experience discomfort resulting from inertia phase period modification and torque limitation. Therefore, the judder prevention control is not executed when the vehicle speed equals or exceeds the predetermined vehicle speed.

It should be noted that the predetermined vehicle speed employed at this time is set at a vehicle speed at which the rotation speed variation rate of the frictional engagement element, as shown in FIG. 3, does not enter the judder occurrence region. In other words, when the auxiliary transmission mechanism 30 is upshifted in a case where the vehicle speed equals or exceeds the predetermined vehicle speed, the rate at which the rotation speed of the frictional engagement element 31 varies during an inertia phase in response to an increase in the accelerator opening APO equals or exceeds a rotation speed variation rate at which judder is predicted to occur. In this case, it is predicted that judder will not occur.

More specifically, in the auxiliary transmission mechanism 30, a shift time is set to remain constant regardless of the vehicle speed with the aim of preventing the driver from experiencing discomfort. Accordingly, the rotation speed variation rate is large when the vehicle speed is high and small when the vehicle speed is low. When the vehicle speed is high, the rotation speed variation rate is large, and therefore, as described above, judder does not occur even if the accelerator opening APO increases during the upshift. Hence, when the vehicle speed is high, the judder prevention control is not executed, and as a result, discomfort experienced by the driver due to the judder prevention control is suppressed.

When the current vehicle speed is determined to be lower than the predetermined vehicle speed, the routine advances to a step S30. When the vehicle speed is determined to equal or exceed the predetermined vehicle speed, the processing of the flowchart is temporarily terminated, and other processing is resumed.

In the step S30, the controller 12 determines whether or not the accelerator opening APO at the start of the 1-2 shift performed in the auxiliary transmission mechanism 30 during the power ON upshift determined in the step S10 is equal to or smaller than a predetermined first threshold. As will be described below, the first threshold is set as a boundary value for determining either that the judder can be suppressed by modifying an inertia period of the auxiliary transmission mechanism 30 and an inertia period of the variator 20 or that torque limitation is required as well as modifying the inertia periods to suppress the judder. When the accelerator opening APO at the start of the 1-2 shift is equal to or smaller than the first threshold, in comparison with a case where the accelerator opening APO at the start of the 1-2 shift is larger than the first threshold, the input torque that is increased during the power ON upshift may vary by an extremely large amount in response to a subsequent increase in the amount of variation in the accelerator opening APO accompanying further depression. In this case, judder cannot be suppressed simply by modifying the inertia phase periods, and therefore torque limitation is implemented additionally.

The amount of torque input into the auxiliary transmission mechanism 30 when the accelerator opening APO is comparatively small during execution of the power ON upshift is smaller than when the accelerator opening APO is large, and therefore the rotation variation rate during the 1-2 shift is small (i.e. corresponds to an upper left side region on the judder occurrence region map shown in FIG. 3). Here, when the driver depresses the accelerator pedal further, the input torque from the engine 1 increases on as to become more likely to enter the judder occurrence region. Accordingly, the controller 12 prepares a torque limitation for restricting the torque of the engine 1 in order to suppress judder.

When it is determined in the determination of the step S30 that the accelerator opening APO at the start of the 1-2 shift in the auxiliary transmission mechanism 30 is equal to or smaller than the first threshold, the routine advances to a step S40. When the accelerator opening APO is not equal to or smaller than the first threshold, this means that the accelerator opening APO is large and the shift speed is comparatively high, and therefore the routine advances to a step S80 without performing processing for reducing the torque.

In the step S40, the controller 12 performs preparations for activating torque limitation. More specifically, the controller 12 sets a torque reduction command value at zero, and issues the torque reduction command value to the engine 1. The engine 1, having received the torque reduction command value, reduces the torque on the basis of the torque reduction command value. At the point of the step S40, however, the command value is zero, and therefore, in actuality, a torque reduction is not performed.

Figure 5:
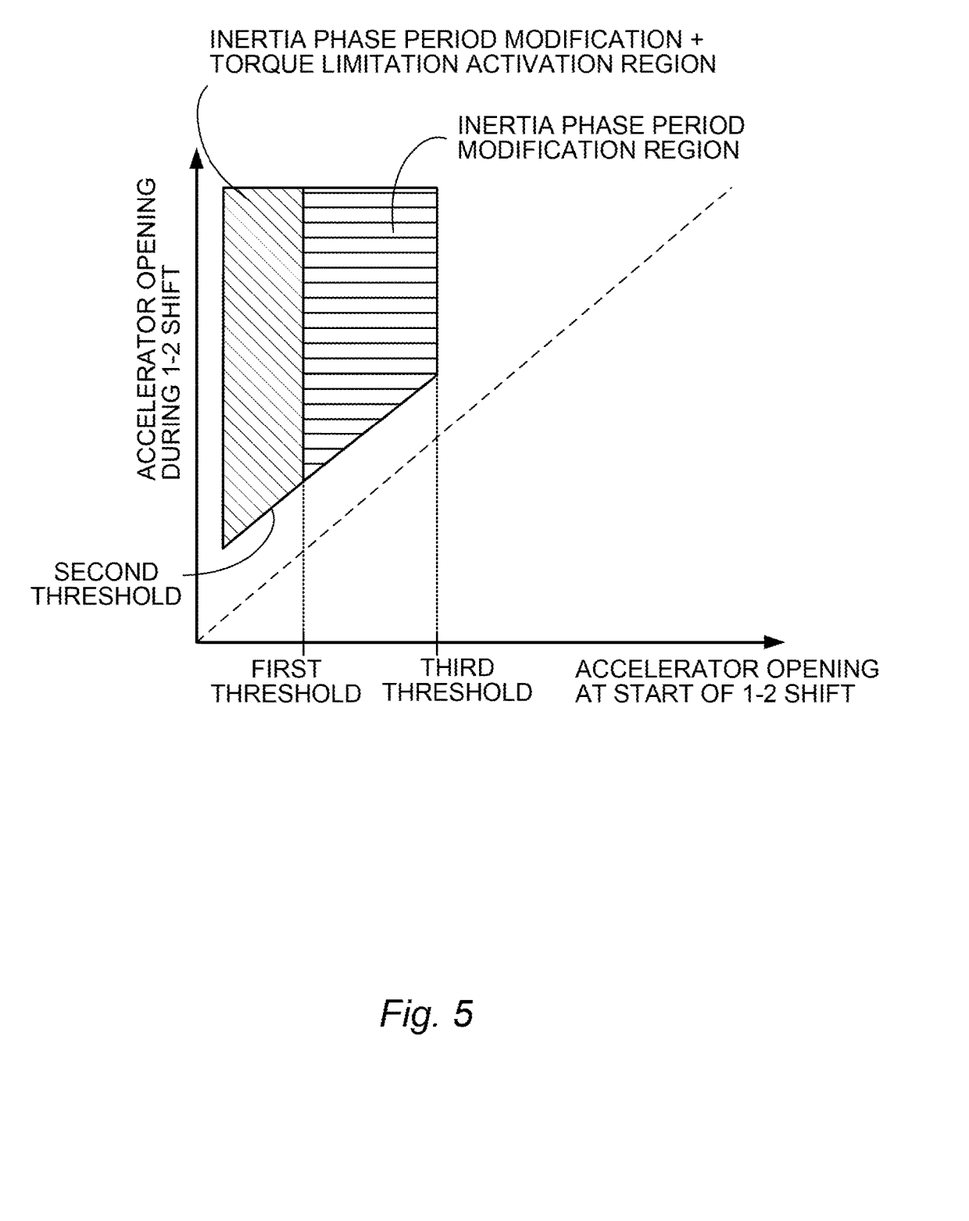
FIG. 5 is an illustrative view showing a judder prevention map according to an embodiment of this invention.

Next, in a step S50, the controller 12 determines whether or not the accelerator opening APO has reached or exceeded a predetermined second threshold during a speed change of the 1-2 shift in the auxiliary transmission mechanism 30. Here, the speed change of the 1-2 shift in the auxiliary transmission mechanism 30 extends from the start of a preparation phase to the end of the inertia phase of the auxiliary transmission mechanism 30. The second threshold is an accelerator opening set by adding a predetermined value at which further depression is detected to the accelerator opening at the start of the 1-2 shift. In FIG. 5, the second threshold is set to increase steadily as the accelerator opening at the start of the 1-2 shift increases (as shown by a solid line that rises to the right in FIG. 5). By setting the predetermined value as described above, further depression is not determined erroneously when the driver does not intend to perform further depression. Accordingly, a slight increase in the accelerator opening APO is not determined as further depression, and in this case NO is determined in the step S50.

When it is determined that the accelerator opening APO has reached or exceeded the second threshold during the speed change of the 1-2 shift in the auxiliary transmission mechanism 30, the routine advances to a step S70. When it is determined that the accelerator opening APO has not reached or exceeded the second threshold, the routine advances to a step S60.

In the step S70, the controller 12 activates torque limitation. When the accelerator opening APO reaches or exceeds the second threshold during the speed change of the 1-2 shift in the auxiliary transmission mechanism 30, the amount of input torque from the engine 1 is too large to be removed from the judder occurrence region simply by modifying the inertia phase periods, as will be described below, and therefore judder is predicted to occur. Hence, the controller 12 reduces the torque of the engine 1 by issuing a predetermined torque reduction command value to the engine 1. The torque reduction command value is set on the basis of the input torque and the rotation speed variation rate of the frictional engagement element during the 1-2 shift in the auxiliary transmission mechanism 30 so that the input torque moves out of the judder occurrence region in FIG. 3.

Hence, when the accelerator opening APO varies following the start of the power ON upshift, the torque of the engine 1 is reduced in accordance with the magnitude of the accelerator opening APO following the variation therein.

When the accelerator opening APO is smaller than the second threshold in the step S50, it is determined to be unnecessary to reduce the torque of the engine 1, and the routine advances to the step S60. In the step S60, the controller 12 determines whether or not the inertia phase has ended, and waits for the inertia phase to end. When it is determined that the inertia phase has ended, the processing of the flowchart is temporarily terminated, and other processing is resumed. When it is determined that the inertia phase has not ended, the routine returns to the step S40, and the processing is repeated.

When the accelerator opening APO is larger than the first threshold in the step S30, or following the processing of the step S70, the routine advances to the step S80, where the controller 12 determines from the accelerator opening APO whether or not the accelerator pedal has been depressed further during the speed change of the 1-2 shift. Here, the speed change of the 1-2 shift in the auxiliary transmission mechanism 30 extends from the start of the preparation phase to the end of the inertia phase of the auxiliary transmission mechanism 30. When the accelerator pedal has been depressed further, the input torque from the engine 1 increases so as to enter the judder occurrence region, and therefore judder is predicted to occur. Further depression of the accelerator pedal is determined by determining whether or not the accelerator opening APO has reached or exceeded the second threshold, similarly to the step S50. Further depression of the accelerator pedal includes depression of the accelerator pedal from an accelerator opening APO of zero (i.e. from a condition in which the accelerator pedal is not depressed). Further, in the step S80, a determination as to whether or not variation in the torque requested by the driver equals or exceeds a predetermined threshold may be made as well as determining whether or not the accelerator opening APO equals or exceeds the second threshold. In so doing, the determination as to whether or not the accelerator pedal has been depressed further can be made with greater precision.

When it is determined that the accelerator pedal has been depressed further, the routine advances to a step S90, where control for preventing judder is executed by modifying the inertia phase periods. When it is determined that the accelerator pedal has not been depressed further, the processing of the flowchart is temporarily terminated, and other processing is resumed.

When YES is obtained in the determination of the step S80, or in other words when the accelerator pedal has been depressed further following the start of the 1-2 shift in the auxiliary transmission mechanism 30, leading to variation in the accelerator opening APO toward the large side, judder is suppressed by modifying the inertia phase periods so as to allow the through speed ratio to vary, as in the processing of the following step S90.

In the step S90, the controller 12 makes the inertia phase period of the auxiliary transmission mechanism 30 shorter than the inertia phase period thereof during a normal 1-2 shift in which the judder prevention control is not executed. At the same time, the controller 12 makes the inertia phase period of the variator 20 longer than the inertia phase period thereof during a normal 1-2 shift.

By shortening the inertia phase period of the auxiliary transmission mechanism 30 in the control of the step S90, relative rotation speed variation (a rotation speed variation rate) in the frictional engagement element 31 between an input rotation speed and an output rotation speed is increased. By increasing the rotation speed variation rate of the frictional engagement element 31, a time required to engage the frictional engagement element 31 is reduced, and as a result, the auxiliary transmission mechanism 30 moves to the region on the lower side of the judder occurrence region in FIG. 3 such that the occurrence of judder is suppressed.

In the control of the step S90, the inertia phase period of the variator 20 is made longer than the inertia phase period thereof during a normal 1-2 shift, and as a result, a time required for the speed ratio of the variator 20 to shift from the Low side to the High side increases. In other words, the rotation speed of the variator 20 becomes slower than the rotation speed thereof during a coordinated shift.

More specifically, the inertia phase period of the variator is lengthened as follows. In FIG. 2, when a shift that crosses the mode switch shift line is performed at an accelerator opening APO indicated by a solid line arrow (⅖, for example), whereupon the accelerator pedal is depressed further, as indicated by a dotted line arrow (to ⅜, for example), a shift time is delayed by lengthening the inertia phase period of the variator 20, as described above. A shift speed at this time is set to be lower than the shift speed in a case (indicated by a dot-dash line arrow) where the vehicle speed increases so as to cross the mode switch shift line while the accelerator opening APO remains constant at ⅜.

When the inertia phase period of the variator 20 is delayed relative to the inertia phase period of the auxiliary transmission mechanism 30 in this manner, the through speed ratio shifts to the High side of the through speed ratio during a normal 1-2 shift. Accordingly, the rotation speed of the engine 1 decreases relative to the rotation speed during a normal 1-2 shift, and therefore the amount of torque input from the engine 1 also decreases, with the result that judder in the frictional engagement element 31 of the auxiliary transmission mechanism 30 can be suppressed. When the inertia phase periods are modified, the coordinated shift becomes uncoordinated, leading to a temporary shift to the upshift side, but as long as a torque reduction is not executed on the engine 1 in the step S70, the torque of the engine 1 does not decrease, and therefore the driver is prevented from experiencing discomfort.

In the processing of the step S90, the shift speed of the variator 20 following the end of the inertia phase of the auxiliary transmission mechanism 30 is controlled so as to remain at the rotation speed during the inertia phase of the auxiliary transmission mechanism 30. The reason for this is to prevent the driver from experiencing shock and discomfort due to rapid variation in the engine rotation speed Ne occurring when the speed ratio of the variator 20 is varied rapidly in a direction for suppressing variation in the through speed ratio at the end of the inertia phase of the auxiliary transmission mechanism 30.

Hence, by performing control in accordance with the flowchart shown in FIG. 4 to upshift the through speed ratio by modifying the respective inertia phase periods employed in the auxiliary transmission mechanism 30 and the variator 20 during a coordinated shift in a case where the accelerator opening APO at the start of the 1-2 shift is equal to or lower than the first threshold and further depression of the accelerator pedal causing the accelerator opening APO to reach the second threshold is detected during the 1-2 shift, the input torque of the frictional engagement element 31 is reduced, and as a result, judder is prevented from occurring. When the accelerator opening APO is smaller than the second threshold, the output torque of the engine 1 does not increase, and therefore preventing the driver from experiencing discomfort is prioritized over implementing the judder prevention control. Accordingly, the control is not executed.

Further, when the accelerator opening APO is equal to or smaller than the first threshold at the start of the 1-2 shift, preparations for activating torque limitation are performed. When the accelerator opening APO reaches or exceeds the second threshold during the 1-2 shift such that the amount of input torque input into the transmission 4 increases and judder cannot be avoided simply by modifying the inertia phase periods as described above, a torque reduction is executed on the engine 1 as well as modifying the inertia phase periods. In other words, when the accelerator opening APO increases beyond the second threshold, torque limitation is activated.

FIG. 5 is an illustrative view showing a judder prevention map according to this embodiment of the invention.

The judder prevention map shows a region in which judder is predicted and control is performed to prevent judder from occurring when the accelerator opening at the start of the 1-2 shift in the auxiliary transmission mechanism 30 is set on the abscissa and the accelerator opening during the 1-2 shift in the auxiliary transmission mechanism 30 is set on the ordinate.

When the accelerator opening APO is smaller than the first threshold at the start of the 1-2 shift, YES is obtained in the determination of the step S30 in FIG. 4, and when the accelerator opening APO reaches or exceeds the second threshold during the 1-2 shift, YES is obtained in the determination of the step S50. In this case, torque limitation is activated in relation to the engine 1 as well as modifying the inertia phase periods (an inertia phase period modification+torque limitation activation region).

Further, when the accelerator opening APO at the start of the 1-2 shift is larger than the first threshold, NO is obtained in the determination of the step S30 in FIG. 4. In this case, the inertia phase periods are modified in accordance with further depression of the accelerator (an inertia phase period modification region).

Furthermore, when the vehicle speed VSP is lower than the predetermined vehicle speed in the step S20 of FIG. 4, the judder prevention control is executed, but when the vehicle speed VSP equals or exceeds the predetermined vehicle speed, the rate at which the rotation speed of the frictional engagement element 31 varies during the inertia phase is large, and therefore the judder prevention control is not executed. Moreover, when the accelerator opening VSP the start of the 1-2 shift is larger than a third threshold in FIG. 5, the rate at which the rotation speed of the frictional engagement element 31 varies during the inertia phase is large, and therefore judder does not occur. Hence, the judder prevention control is not executed.

Figure 6:
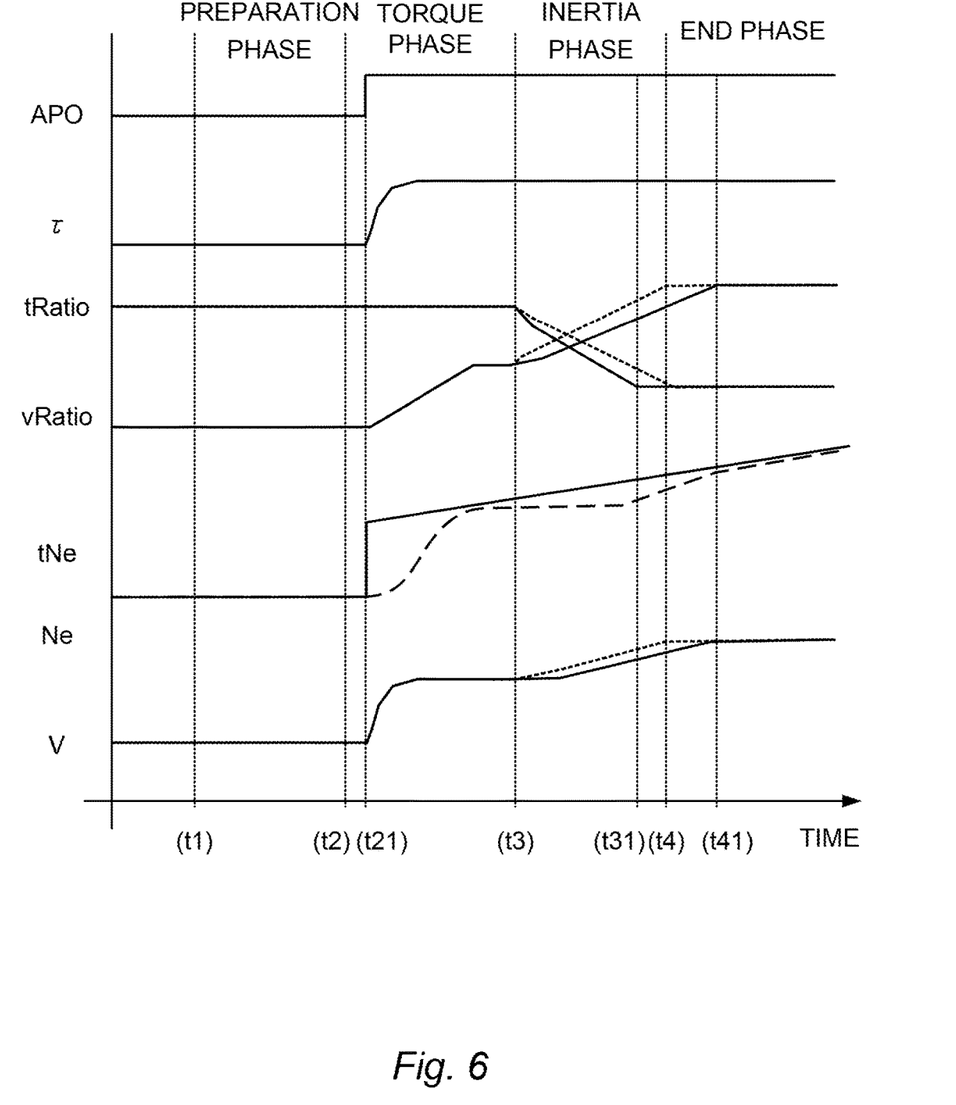
FIG. 6 is a time chart showing control performed during a power ON upshift according to an embodiment of this invention.

FIG. 6 is a time chart showing the control performed during the power ON upshift according to this embodiment of the invention.

FIG. 6 shows, in descending order, the accelerator opening APO, an engine torque signal τ, a target auxiliary speed ratio tRatio, a target variator speed ratio vRatio, a target engine rotation speed tNe (solid line), the engine rotation speed Ne (dotted line), and a clutch input torque V, in relation to time shown on the abscissa.

In FIG. 6, the controller 12 determines that a power ON upshift is being executed at a timing t1. Accordingly, a preparation phase is executed as preparation for switching the engagement conditions of the frictional engagement elements 31 of the auxiliary transmission mechanism 30. During the preparation phase, the controller 12 performs pre-charging to suppress an oil pressure response delay by temporarily increasing the oil pressure of the engagement side frictional engagement element 31, then sets the oil pressure at a torque transmission start oil pressure, and then remains on standby. Further, the controller 12 sets the oil pressure of the disengagement side frictional engagement elements 31 at a predetermined pressure and then remains on standby.

When the controller 12 determines that a power ON upshift is being executed, YES is obtained in the determination of the step S10 in FIG. 4, and therefore the routine advances to the step S20. When the vehicle speed is determined to be lower than the predetermined vehicle speed in the step S20, the routine advances to the step S30, where the controller 12 determines from the accelerator opening APO at the start of the 1-2 shift whether or not to activate torque limitation.

The time chart in FIG. 6 shows an example of a case in which the accelerator opening APO is larger than the first threshold such that NO is obtained in the determination of the step S30. In this case, the routine advances to the step S80, where the controller 12 determines whether or not the accelerator pedal has been depressed further.

Following the preparation phase, the controller 12 advances to a torque phase at a timing t2. In the torque phase, the controller 12 executes preliminary control to vary the speed ratio by varying the torque of an output shaft of the auxiliary transmission mechanism 30 while ensuring that the rotation speed of an input shaft of the auxiliary transmission mechanism 30 does not vary.

Here, when the accelerator pedal has been depressed further (a timing t21), YES is obtained in the determination of the step S80 on the flowchart shown in FIG. 4, and therefore the processing of the step S90 is executed. In other words, judder is suppressed by shortening the inertia phase period of the auxiliary transmission mechanism 30.

When the routine shifts from the torque phase to the inertia phase (a timing t3), the controller 12 switches the engagement conditions of the frictional engagement elements of the auxiliary transmission mechanism 30 by engaging the engagement side frictional engagement element 31 and disengaging the disengagement side frictional engagement elements 31. At this time, the processing of the step S90 in FIG. 4, i.e. the control for shortening the inertia phase period of the auxiliary transmission mechanism 30 and lengthening the inertia phase period of the variator 20, is executed.

In FIG. 6, the controller 12 makes the inertia phase period of the auxiliary transmission mechanism 30 shorter (t3-t31) than the inertia phase period (t3-t4, indicated by a dotted line) thereof during a normal 1-2 shift in which the judder prevention control is not executed. Accordingly, the variation speed of the frictional engagement elements 31 of the auxiliary transmission mechanism 30 increases, and as a result, judder is suppressed. Meanwhile, the control 12 makes the inertia phase period of the variator 20 longer (t3-t41) than the inertia phase period (t3-t4, indicated by a dotted line) thereof during a normal 1-2 shift.

By shortening the inertia phase period of the auxiliary transmission mechanism 30 in this manner, the rotation variation rate of the frictional engagement elements 31 is increased, and as a result, judder can be suppressed. By lengthening the inertia phase period of the variator 20, the through speed ratio is shifted to the High side of the through speed ratio during a normal 1-2 shift, and therefore the rotation speed of the engine 1 decreases relative to the rotation speed during a normal 1-2 shift. Accordingly, the amount of torque input into the auxiliary transmission mechanism 30 from the engine 1 decreases, and as a result, judder can be suppressed.

Figure 7:
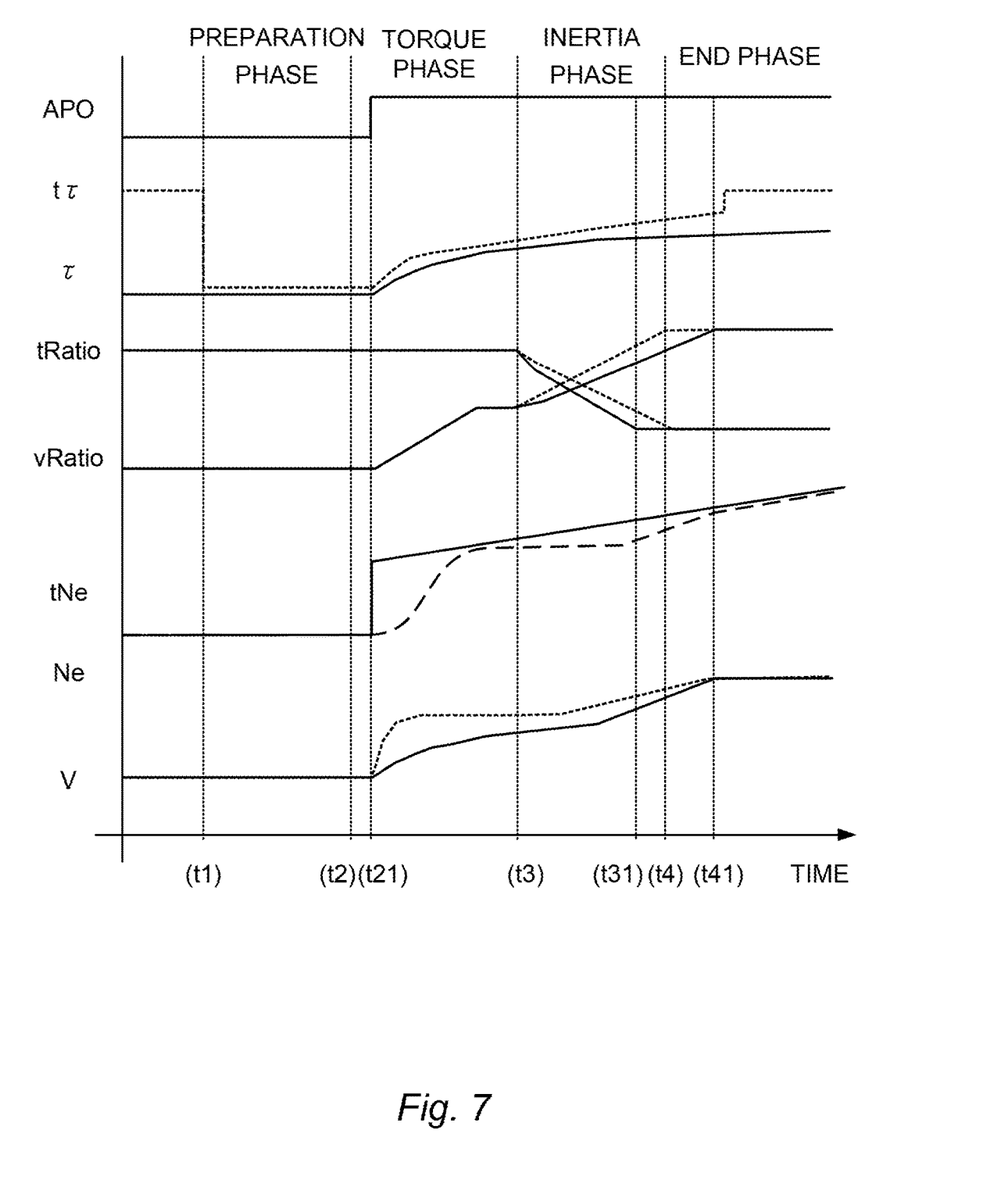
FIG. 7 is a time chart showing control performed during a power ON upshift according to an embodiment of this invention.

FIG. 7 is a time chart showing the control performed during the power ON upshift according to this embodiment of the invention.

The time chart in FIG. 7 is similar to the time chart shown in FIG. 6, but shows an example of a case in which a torque limitation operation is performed. In FIG. 7, a torque reduction command value tτ is shown in addition to the engine torque signal T.

In FIG. 7, the controller 12 determines that a power ON upshift is being executed at a timing t1. Accordingly, the preparation phase is executed. In this case, YES is obtained in the determination of the step S10 in FIG. 4, and therefore the routine advances to the step S20. When the vehicle speed is determined to be lower than the predetermined vehicle speed in the step S20, the routine advances to the step S30, where the controller 12 determines from the accelerator opening APO at the start of the 1-2 shift whether or not to activate torque limitation.

The time chart in FIG. 7 shows an example of a case in which the accelerator opening APO is equal to or smaller than the first threshold such that YES is obtained in the determination of the step S30. In this case, the routine advances to the step S40, where preparations for activating torque limitation are performed. At this time, the torque reduction command value is initially set at zero (indicated by a dotted line in FIG. 7).

Next, the controller 12 determines in the step S50 whether or not the accelerator opening APO during the 1-2 shift equals or exceeds the second prescribed value, i.e. whether or not a condition for activating torque limitation is satisfied.

In the example shown in FIG. 7, following the preparation phase, the routine advances to the torque phase at a timing t2. When, at this time, the accelerator pedal has been depressed further (a timing t21) such that the accelerator opening APO equals or exceeds the second threshold, torque limitation is activated in the step S70, whereby the torque reduction command value tτ is issued to the engine 1 in order to reduce the torque. Accordingly, the clutch input torque V, which is indicated by a dotted line, decreases as shown by a solid line, and as a result, judder is suppressed.

Thereafter, YES is obtained in the determination of the step S80, and therefore the processing of the step S90 is executed. More specifically the inertia phase period of the auxiliary transmission mechanism 30 is made shorter (t3-t31) than the inertia phase period (t3-t4, indicated by a dotted line) thereof during a normal 1-2 shift, and the inertia phase period of the variator 20 is made longer (t3-t41) than the inertia phase period (t3-t4, indicated by a dotted line) thereof during a normal 1-2 shift.

By shortening the inertia phase period of the auxiliary transmission mechanism 30 in this manner, the rotation variation rate of the frictional engagement elements 31 is increased, and as a result, judder can be suppressed. By lengthening the inertia phase period of the variator 20, the through speed ratio, is shifted to the High side of the through speed ratio during a normal 1-2 shift, and therefore the rotation speed of the engine 1 decreases relative to the rotation speed during a normal 1-2 shift. Accordingly, the amount of torque input into the auxiliary transmission mechanism 30 from the engine 1 decreases, and as a result, judder can be suppressed. During this control, when the controller 12 determines on the basis of the accelerator opening APO and the vehicle speed that a size of the predicted judder will be large, the controller 12 may set the inertia phase period of the variator 20 to be steadily later as the size of the predicted judder increases. It should be noted that "the size of the predicted judder will be large" means that large amounts of vibration and noise will be generated in the frictional engagement elements, leading to a reduction in the durability of the frictional engagement elements.

In this embodiment of the invention, the control for suppressing judder is executed during a shift in which the auxiliary transmission mechanism 30 is upshifted and the variator 20 is downshifted. The reason for this is that when the variator 20 is downshifted, the torque input into the auxiliary transmission mechanism 30, which is disposed on the downstream side of the variator 20, increases, and therefore, when the accelerator opening is increased while upshifting the auxiliary transmission mechanism 30, the accelerator opening may enter the judder occurrence region in the engagement side frictional engagement element 31. During a shift in which the auxiliary transmission mechanism 30 is downshifted and the variator 20 is upshifted, on the other hand, the torque input into the auxiliary transmission mechanism 30 decreases in response to the upshift in the variator 20, and therefore the accelerator opening does not enter the judder occurrence region in the engagement side frictional engagement element even when the accelerator opening is increased while downshifting the auxiliary transmission mechanism 30. Accordingly, judder does not occur.

As described above, this embodiment of the invention is applied to a control apparatus for an automatic transmission, the automatic transmission comprising: the transmission 4 comprised by the variator 20, which is a continuously variable transmission mechanism capable of continuously modifying speed ratio, and the auxiliary transmission mechanism 30, which is a stepped transmission mechanism that is disposed on the downstream side of the variator 20 and can be switched between a plurality of gear positions by engaging and disengaging the plurality of frictional engagement elements 31; and the controller 12 serving as a transmission control unit that performs a coordinated shift by shifting the auxiliary transmission mechanism 30 and simultaneously shifting the variator 30 in an opposite direction to the shift direction of the auxiliary transmission mechanism 30 in order to suppress variation in the through speed ratio, i.e. the overall speed ratio of the transmission 4.

In this configuration, when the auxiliary transmission mechanism 30 is upshifted from the first speed to the second speed and the controller 12 predicts, on the basis of an increase in the accelerator opening APO, that judder will occur in the engagement side frictional engagement element 31 during the upshift, the controller 12 performs control while judder is predicted to occur in the engagement side frictional engagement element 31 to reduce the shift speed of the variator 20 in comparison with the shift speed of the variator 20 during the coordinated shift, the coordinated shift being executed at an accelerator opening APO corresponding to the increased accelerator opening APO.

According to this embodiment of the invention, when the accelerator opening APO increases during an upshift in the auxiliary transmission mechanism 30 such that judder is predicted to occur in the frictional engagement element 31, the shift speed of the variator 20 is reduced in comparison with the shift speed of the variator 20 during the coordinated shift that is executed at an accelerator opening APO corresponding to the increased accelerator opening APO. By reducing the shift speed of the variator 20 in this manner, the driving force that is transmitted to the drive wheel from the transmission 4 during the upshift can be increased or maintained at a previous value, and therefore the driving force does not decrease into the judder occurrence region. Hence, an undesired reduction in the driving force in spite of the fact that the driver has not performed a return operation on the accelerator pedal does not occur, and as a result, judder in the frictional engagement element 31 of the auxiliary transmission mechanism 30 can be suppressed while preventing the driver from experiencing discomfort.

In other words, when the shift speed of the variator 20 is reduced, the through speed ratio shifts to the High side of the through speed ratio during a normal 1-2 shift such that the rotation speed of the engine 1 decreases relative to the rotation speed during a normal 1-2 shift. Accordingly, the amount of torque input from the engine 1 decreases, and as a result, judder in the frictional engagement element 31 of the auxiliary transmission mechanism 30 can be suppressed.

Furthermore, the controller 12 reduces the shift speed of the variator 20 to a steadily greater degree as the size of the predicted judder increases. By executing this control, judder can be prevented appropriately in accordance with the size of the predicted judder.

Moreover, while judder is predicted to occur in the frictional engagement element 31, the controller 12 increases the engagement speed of the frictional engagement element 31 in comparison with a case where judder is not predicted to occur in the frictional engagement element 31.

By executing this control, the speed at which the rotation speed of the frictional engagement element 31 varies can be increased so as to move out of the judder occurrence region into a region where the degree of judder occurrence is low, and as a result, judder can be suppressed. Moreover, the inertia phase of the speed change in the frictional engagement element 31 can be completed while judder is predicted to occur and the shift speed of the variator is reduced, and therefore judder can be reduced.

Further, the controller 12 increases the engagement speed of the frictional engagement element 31 steadily as the size of the predicted judder increases, and therefore the control for preventing judder can be performed appropriately in accordance with the size of the predicted judder.

Furthermore, the controller 12 determines the size of the judder in the frictional engagement element 31 to be steadily larger as the amount of input torque input into the frictional engagement element 31 during the upshift increases or as the rotation variation speed of the frictional engagement element 31 during the inertia phase of the upshift decreases, and therefore the size of the judder can be determined easily from the input torque or the rotation speed variation.

Moreover, the controller 12 predicts that judder will not occur when the rate at which the rotation speed of the frictional engagement element 31 varies in response to an increase in the accelerator opening APO during the inertia phase of the upshift in the auxiliary transmission mechanism 30 equals or exceeds the rotation speed variation rate at which judder is predicted to occur. When it is predicted that judder will not occur, the control for suppressing judder is not performed. As a result, discomfort caused by a reduction in the driving force when the torque is suppressed and discomfort caused by variation in the speed ratio when the inertia phase periods are modified can be suppressed.

Further, the controller 12 predicts judder on the basis of the vehicle speed. More specifically, when the vehicle speed equals or exceeds the predetermined vehicle speed, the control for suppressing judder is not performed. As a result, the occurrence of judder can be predicted easily from the vehicle speed.

The above-described embodiment of the present invention merely illustrates one of example applications of the present invention, and the specific configuration of the above-described embodiment is not intended to limit a technical scope of the present invention.

In the above embodiment, when judder is predicted, the judder is prevented from occurring by modifying the inertia phase periods of the auxiliary transmission mechanism 30 and the variator 20. However, control may be performed to modify the speed ratio of the variator 20 by initiating the inertia phase in the variator 20 after the 1-2 shift in the auxiliary transmission mechanism 30 is complete instead of shifting the variator 20 to the inertia phase during the inertia phase period of the auxiliary transmission mechanism 30.

More specifically, when the auxiliary transmission mechanism 30 is upshifted, the rotation speed Ne of the engine 1 decreases, leading to a reduction in the input torque from the engine 1, and as a result, judder can be suppressed. The speed ratio of the variator 20 may be modified to a desired ratio thereafter. By upshifting the auxiliary transmission mechanism 30 first in this manner instead of performing a coordinated shift, judder can be prevented.

Furthermore, in the above embodiment, a belt type continuously variable transmission mechanism is provided of the variator 20, but instead, the variator 20 may be a continuously variable transmission mechanism in which a chain is wrapped around the pulleys 21, 22 instead of the V belt 23. Alternatively, the variator 20 may be a toroidal continuously variable transmission mechanism in which a tiltable power roller is disposed between an input disc and an output disc.

Moreover, in the above embodiment, the auxiliary transmission mechanism 30 is a transmission mechanism having two forward gear positions, namely the first speed and the second speed. However, the auxiliary transmission mechanism 30 maybe a transmission mechanism having three or more forward gear positions.

This application claims priority to Japanese Patent Application No. 2013-198554 filed with the Japan Patent Office on Sep. 25, 2013, the entire contents of which are incorporated herein by reference.

The invention claimed is:

1. A control apparatus for an automatic transmission including a continuously variable transmission mechanism continuously modifying speed ratio and a stepped transmission mechanism that is disposed on a downstream side of the continuously variable transmission mechanism and being switched between a plurality of gear positions by engaging and disengaging a plurality of frictional engagement elements, the control apparatus comprising:
a control unit adapted to perform a coordinated shift by shifting the stepped transmission mechanism and simultaneously shifting the continuously variable transmission mechanism in an opposite direction to a shift direction of the stepped transmission mechanism in order to suppress variation in a through speed ratio, which is an overall speed ratio of the automatic transmission,
wherein, when the stepped transmission mechanism is upshifted and the control unit predicts, on the basis of an increase in an accelerator opening, that judder will occur in the frictional engagement element during the upshift, the control unit reduces a shift speed of the continuously variable transmission mechanism while judder is predicted to occur in the frictional engagement element in comparison with a shift speed of the continuously variable transmission mechanism during the coordinated shift, the coordinated shift being executed at an accelerator opening corresponding to the increased accelerator opening.

2. The control apparatus for an automatic transmission as defined in claim 1, wherein the control unit reduces the shift speed of the continuously variable transmission mechanism steadily as a size of the predicted judder increases.

3. The control apparatus for an automatic transmission as defined in claim 1, wherein, while judder is predicted to occur in the frictional engagement element, the control unit increases an engagement speed of the frictional engagement element in comparison with a case where judder is not predicted to occur in the frictional engagement element.

4. The control apparatus for an automatic transmission as defined in claim 1, wherein the control unit steadily increases the engagement speed of the frictional engagement element as the size of the predicted judder increases.

5. The control apparatus for an automatic transmission as defined in claim 1, wherein the control unit determines the size of the judder that is to occur in the frictional engagement element to be steadily larger as an input torque input into the frictional engagement element during the upshift increases, or as a rotation variation speed in the frictional engagement element during an inertia phase of the upshift decreases.

6. The control apparatus for an automatic transmission as defined in claim 1, wherein the control unit predicts that judder will not occur when, due to an increase in the accelerator opening during the upshift in the stepped transmission mechanism, a rate at which the rotation speed of the frictional engagement element varies during the inertia phase reaches or exceeds a rotation speed variation rate at which judder is predicted to occur.

7. The control apparatus for an automatic transmission as defined in claim 1, wherein the control unit predicts judder on the basis of a vehicle speed.

8. A control apparatus for an automatic transmission, comprising:
- the automatic transmission, which is including a continuously variable transmission mechanism continuously modifying speed ratio and a stepped transmission mechanism that is disposed on a downstream side of the continuously variable transmission mechanism and being switched between a plurality of gear positions by engaging and disengaging a plurality of frictional engagement elements; and
- a control unit that performs a coordinated shift by shifting the stepped transmission mechanism and simultaneously shifting the continuously variable transmission mechanism in an opposite direction to a shift direction of the stepped transmission mechanism in order to suppress variation in a through speed ratio, which is an overall speed ratio of the automatic transmission,
- wherein, when the stepped transmission mechanism is upshifted and an accelerator opening increases during the upshift, the control unit terminates the upshift without suppressing variation in the through speed ratio.

9. A control method for an automatic transmission including by a continuously variable transmission mechanism continuously modifying speed ratio and a stepped transmission mechanism that is disposed on a downstream side of the continuously variable transmission mechanism and being switched between a plurality of gear positions by engaging and disengaging a plurality of frictional engagement elements, the control method comprising:
- performing a coordinated shift by shifting the stepped transmission mechanism and simultaneously shifting the continuously variable transmission mechanism in an opposite direction to a shift direction of the stepped transmission mechanism in order to suppress variation in a through speed ratio, which is an overall speed ratio of the automatic transmission, and
- when the stepped transmission mechanism is upshifted, and judder is predicted to occur in the frictional engagement element during the upshift on the basis of an increase in an accelerator opening,
- reducing a shift speed of the continuously variable transmission mechanism while judder is predicted to occur in the frictional engagement element in comparison with a shift speed of the continuously variable transmission mechanism during the coordinated shift, the coordinated shift being executed at an accelerator opening corresponding to the increased accelerator opening.

* * * * *